(12) United States Patent
Kvamme et al.

(10) Patent No.: US 6,175,883 B1
(45) Date of Patent: Jan. 16, 2001

(54) SYSTEM FOR INCREASING DATA TRANSFER RATE USING SYCHRONOUS DMA TRANSFER PROTOCOL BY REDUCING A TIMING DELAY AT BOTH SENDING AND RECEIVING DEVICES

(75) Inventors: Eric Kvamme, Scotts Valley; Jeffery Appelbaum, San Mateo; Farrokh Mottahedin, San Jose, all of CA (US)

(73) Assignee: Quantum Corporation, Milpitas, CA (US)

( * ) Notice: Under 35 U.S.C. 154(b), the term of this patent shall be extended for 0 days.

(21) Appl. No.: 09/085,330

(22) Filed: May 26, 1998

Related U.S. Application Data

(63) Continuation-in-part of application No. 08/555,977, filed on Nov. 21, 1995, now Pat. No. 5,758,188.

(51) Int. Cl.$^7$ .................................................. G06F 13/28
(52) U.S. Cl. ............................. 710/22; 710/25; 710/35; 710/60; 710/61; 709/212; 713/400
(58) Field of Search .................... 710/22, 35, 60, 710/61, 25; 709/212; 713/400

(56) References Cited

U.S. PATENT DOCUMENTS

| | | | |
|---|---|---|---|
| 4,785,453 | * 11/1988 | Chandran et al. | 371/68 |
| 4,845,675 | * 7/1989 | Krenik et al. | 365/203 |
| 4,888,684 | * 12/1989 | Lilja et al. | 364/200 |
| 5,546,344 | * 8/1996 | Fawcett | 365/189.05 |
| 5,548,285 | * 8/1996 | Ford et al. | 341/100 |
| 5,729,529 | * 3/1998 | Martinsson | 370/235 |
| 5,734,836 | * 3/1998 | Fujishima et al. | 395/200.81 |
| 5,867,541 | * 2/1999 | Tanaka et al. | 375/354 |
| 5,982,778 | * 11/1999 | Mangin et al. | 370/445 |
| 5,995,488 | * 11/1999 | Kalkunte et al. | 370/232 |

* cited by examiner

*Primary Examiner*—Thomas C. Lee
*Assistant Examiner*—Thuan Du
(74) *Attorney, Agent, or Firm*—Henry Groth (57) ABSTRACT

A synchronous DMA burst transfer method is provided for transferring data between a host device and a peripheral drive device connected by an ATA bus. The method provides synchronous data transfer capability in an asynchronous system by having one device in charge of both a strobe signal and a data signal. When a host read or write command is delivered to the peripheral drive device, the peripheral device decides when to start the synchronous DMA burst. For a read command, the peripheral device requests the synchronous DMA burst then drives a data word onto the ATA bus after the host acknowledges that it is ready to begin the burst. After allowing time for the data signal to settle, the peripheral device toggles a strobe signal from a high state to a low state. The host sees the edge of the strobe signal at which time the host latches the data word on the bus. Additional data words can be driven on the bus and the strobe signal can be retoggled to latch the additional data words into the host. After all data words have been transferred, the strobe signal is returned to a high state so that it is ready to be used for another host command. By reducing the hold time of the receiving device and controlling the hold time of the sending device, the method reduces timing delays and provides a data transfer rate up to 66.7 MBytes/sec. The method is easily implemented in existing systems and is backward compatible with existing transfer protocols.

7 Claims, 6 Drawing Sheets

SYSTEM FOR INCREASING DATA TRANSFER RATE USING SYCHRONOUS DMA TRANSFER PROTOCOL BY REDUCING A TIMING DELAY AT BOTH SENDING AND RECEIVING DEVICES

CROSS-REFERENCE TO RELATED APPLICATION

This is a continuation-in-part of U.S. patent application Ser. No. 08/555,977, filed Nov. 21, 1995, issued as U.S. Pat. No. 5,758,188, the disclosure thereof being incorporated herein by reference.

FIELD OF THE INVENTION

The present invention relates to data transfer between a host device and a peripheral drive device via a bus. More particularly, the invention relates to an improved method for performing synchronous direct memory access, DMA, data transfers at an increased data rate.

BACKGROUND

Data transfer rates between a host device and peripheral drive devices within a personal computer, PC, system are limited by the bus architecture interconnecting the devices. One type of bus commonly used to interconnect or interface the peripheral drive device to a system bus of a PC is an ATA bus, which is a disk drive interface originally designed for the ISA bus of the IBM PC/AT. The ATA bus was first configured using LS-TTL (Low-power Schottky transistor-transistor logic) gates to drive an 18 inch cable. The slow edges of the LS-TTL gates and the short cable length worked adequately in the then existing systems. However, as PC systems have become faster and more complex, the definition of the ATA bus has been expanded to include operating modes performing faster data transfer rates, and hardware designers have often extended the ATA cable length to well over 18 inches. For example, PIO (programmed I/O) modes now include PIO modes 0–4. Modes 0, 1 and 2 correspond to the ATA interface as originally defined, while PIO Mode 3 defines a maximum data transfer rate of 11.1 MBytes/sec and PIO Mode 4 defines a maximum transfer rate of 16.7 MBytes/sec. Similarly, new DMA modes have been defined. Multiword DMA Mode 0 corresponds to the original interface, while DMA Modes 1 and 2 provide faster data transfer rates. Multiword DMA Mode 2 has the same maximum transfer rate as the new PIO Mode 4.

These new operating modes require higher performance from the ATA bus, resulting in an effort to increase data transfer rates by reducing cycle times. The effort to reduce cycle times has been accomplished by increasing edge rates. The increased edge rates together with the increase in ATA cable length have in turn led to the emergence of weaknesses in the original ATA cabling configuration. These weaknesses affect the integrity of the signals transmitted over the cable. Of particular concern are excessive ringing and crosstalk between signals, and timing/propagation delays which can lead to system failure and/or data loss. Increased edge rates and excessive cable length cause these problems. Thus, the data transfer rate of valid usable data is restricted by limitations inherent to the structure of the ATA bus.

The increased edge rates and excessive cable length are problematic to the ATA bus because it is a poorly terminated bus structure design. The standard 18 inch ATA bus cable is generally modeled as a single-ended transmission line with a characteristic impedance typically of about 110 ohms and a propagation velocity typically of about 60% c. According to transmission line theory, ringing occurs when the termination impedance does not match the characteristic impedance of the cable. The amplitude of ringing is increased with a greater mismatch of impedances. Ringing of sufficient amplitude on signal and data lines of the ATA bus can cause false triggering and excessive settling delays which can lead to system failure and/or data loss.

The occurrence of ringing is especially problematic for data transfers over an ATA bus in PC systems because digital information is being transferred over a transmission line. According to another aspect of transmission line theory, information to be transmitted over the transmission line is input as a waveform. Due to the characteristic impedance and length of the transmission line, the waveform output from the transmission line has some distortion. In analog transmissions where the input waveforms are generally sine waves, the output waveform is typically distorted by a phase shift which can be corrected with relative ease. However, in digital transmissions, the input waveforms are generally some type of square wave, since recognition of an edge transistion is what is important due to the fact that information transmitted is in the form of 1's and 0's. Distortion of these square waves is evident as ringing, which results in a waveform in which the edge transistions cannot be clearly recognized. Thus, chances for false triggering, as mentioned above, are likely and symptomatic of digital transmissions.

The problem of increased ringing has become more prevalent recently because the bus architecture of the modem PC has changed to accommodate increased processor and drive speeds. As processor bus speeds have increased from 8 MHz to 33 MHz and disk drives have increased in speed, it has become necessary to update the ATA standard to allow for faster data transfer rates. To reduce propagation delay, some manufacturers have increased the output drive of the host in order to slew the output signal faster with the capacitive load of the cable. This has been accomplished by implementing the ATA interface chips with fast CMOS processes instead of the low speed TTL devices used in the first ATA buses. As a result, the output impedance has decreased, and the edge rates on the ATA bus have decreased to 1 to 2 ns or less, as opposed to a 5 to 6 ns range of the TTL devices. These fast edges without sufficient terminations have aggravated the ringing on the bus to the point that many system/drive combinations fail to work.

Crosstalk occurs when switching on one signal line causes induced signals in an adjacent or nearby line. A signal couples into an adjacent line by two mechanisms: coupling capacitance and mutual inductance. As a switching signal wavefront propagates down a cable, it couples energy into the adjacent line. Once the energy is in the second line, it propagates in both directions: toward the receiver and toward the source. The magnitude of the coupled signal is proportional to the rate of change of the signal in the primary line. Additionally, the amplitude of the coupled signal is proportional to the total amount of coupling capacitance and mutual inductance, and is therefore proportional to cable length. These crosstalk characteristics make it important to control the slew rate and cable length of newer ATA bus drivers because fast edge rates and resulting ringing on the data lines can couple by crosstalk into adjacent control lines, and cable lengths over 18 inches increase the probability of crosstalk.

An additional concern associated with the poor termination and cable length of an ATA bus design is propagation delay which is further aggravated by cable length violations.

As discussed above, the ATA bus was originally defined to have a maximum length of 18 inches. However, today, system designers are hard pressed to design a system in which a host device can be connected to a peripheral drive device within 18 inches. Moreover, some systems are being implemented with dual-ATA interface ports for sharing two ATA cables. These ports are not completely independent of each other, and dual-porting results in an ATA cable which is effectively 36 inches long. These increased cable lengths impose propagation delays associated with the host and peripheral drive devices sending control and data signals back and forth to each other. These propagation delays ultimately affect the data transfer rate and overall performance of the bus.

A further concern related to data transfers over the ATA bus is data integrity. It is important that the data transferred over the bus is valid, and thus there is a desire to provide error detection capability which is reliable and which can be easily implemented. Since words made up of data bits are being transferred over the ATA bus, a bit oriented error detection approach is more practical than a symbol oriented error detection approach. However, conventional bit oriented error detection is impractical for data transfers occurring over the ATA bus, because the conventional bit oriented error detection is a bit-serial approach. The conventional bit error detection procedure generates a cyclic redundancy code (CRC) value by logically manipulating a stream of input data bits using a generator polynomial:

$$G(X)=X^{16}+X^{12}+X^5+1.$$

Each bit of the data stream is shifted sequentially into a CRC logic encoder/decoder by a bit clock operating at a bit cell timing rate. Since the data transfers occurring over the ATA bus are transferring 16-bit words of data, each word is transferred at a clock period equal to 16 times the bit clock. Thus, using the existing bit serial approach operated by a bit clock would require clocking at the frequency of the bit clock, or 16 times the word clock. A further problem of the bit-serial approach is that since the data is being transferred in word units, there is no bit clock available at this part of the ATA interface circuit structure. Thus, the existing bit oriented error detection procedure is not a practical method of providing data integrity for data transfers over the ATA bus.

The above discussed limitations of the ATA bus design have restricted the data transfer capability between a host device and a peripheral drive device to the rates as described above. With the emergence of still faster processors and peripheral devices it is desirous to obtain still faster and accurate data transfer rates between the host and peripheral drive devices. The synchronous DMA, or Ultra DMA, transfer protocol described in U.S. Pat. No. 5,758,188, enabled an increased data transfer rate over the above described prior protocols to approximately 33.3 Mbytes/sec. However, the transfer rate of future peripheral devices will eventually exceed the 33.3 Mbytes/sec transfer rate of the bus interface, causing a bottleneck for performance over the bus interface. Thus, there exists a hitherto unsolved need for an improved, method for performing data transfers between a host device and a peripheral drive device over a bus interface having certain operational limitations, at an increased data transfer rate without violating the operational limitations of the bus interface.

SUMMARY

The method of the present invention satisfies these needs.

The present invention is directed to an improved method for performing a synchronous DMA burst in a computer system which includes a host device connected to at least one peripheral drive device by a bus, where the bus has an associated control signal transmission strobe rate and is used for data transfers between the peripheral drive device and the host device in response to a host device read or write command. The data transfers for each command are carried out through a series of the synchronous DMA bursts over the bus.

With the present invention, the data transfer rate for a synchronous, or Ultra, DMA transfer is increased by minimizing the data hold time for the receiving device to be about 0 ns and by tightly controlling the data valid hold time of the sending device. The combination of the two hold times provides a maximum setup time margin or differential, which enables the increased data transfer rate.

Additionally, the method can include setting a data valid setup time of the sending device which more particularly determines the increased data transfer rate. In general, by minimizing the hold time of the receiver to about 0 ns, and decreasing the hold and setup times of the sender, the data transfer rate for a synchronous DMA burst is increased over the existing synchronous DMA 33 transfer rate.

The method of the present invention provides advantages over the existing synchronous DMA transfer protocols. In particular, the improved synchronous DMA burst transfer protocol described herein provides significantly increased data transfer rates between a host device and a peripheral drive device and is operable with minor modifications to existing bus system architectures. The present method is therefore an inexpensive way to increase the rate of data transfer between a host device and a peripheral drive device. A further advantage of the present method is that backward compatibility with existing transfer protocols is also provided so that the method is operable without substantial hardware modifications in systems including other peripheral drive devices which use the existing synchronous DMA transfer protocols.

BRIEF DESCRIPTION OF THE DRAWINGS

These and other features, aspects and advantages of the present invention will become better understood with regard to the following description, appended claims and accompanying drawings where:

DESCRIPTION

Figure 1A:
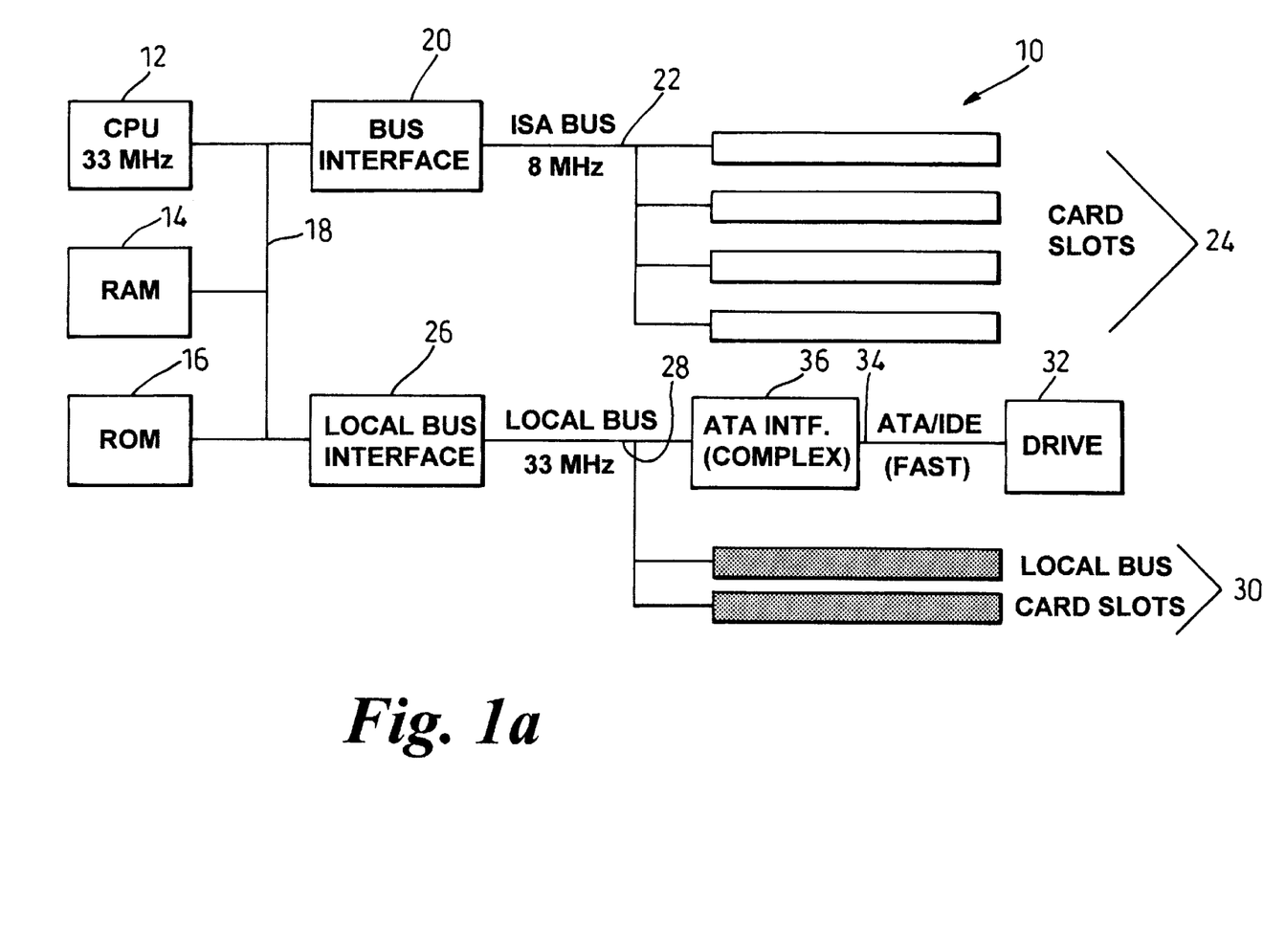
FIG. 1a shows a block diagram of a PC architecture in which the present invention can be implemented.

FIG. 1a shows an example of a conventional PC architecture in which a method embodying aspects of the present invention can be implemented. The PC system 10 typically includes a CPU 12 connected to a RAM 14 and a ROM 16 by a processor bus 18. A bus interface 20 connects the processor bus 18 to an ISA bus 22 which can include a plurality of card slots 24. Additionally, a local bus interface 26 connects the processor bus 18 to a local bus 28 which can also include a number of local bus card slots 30. A peripheral drive device 32 is connected to the local bus 28 via an ATA bus 34 and ATA interface 36.

Figure 1B:
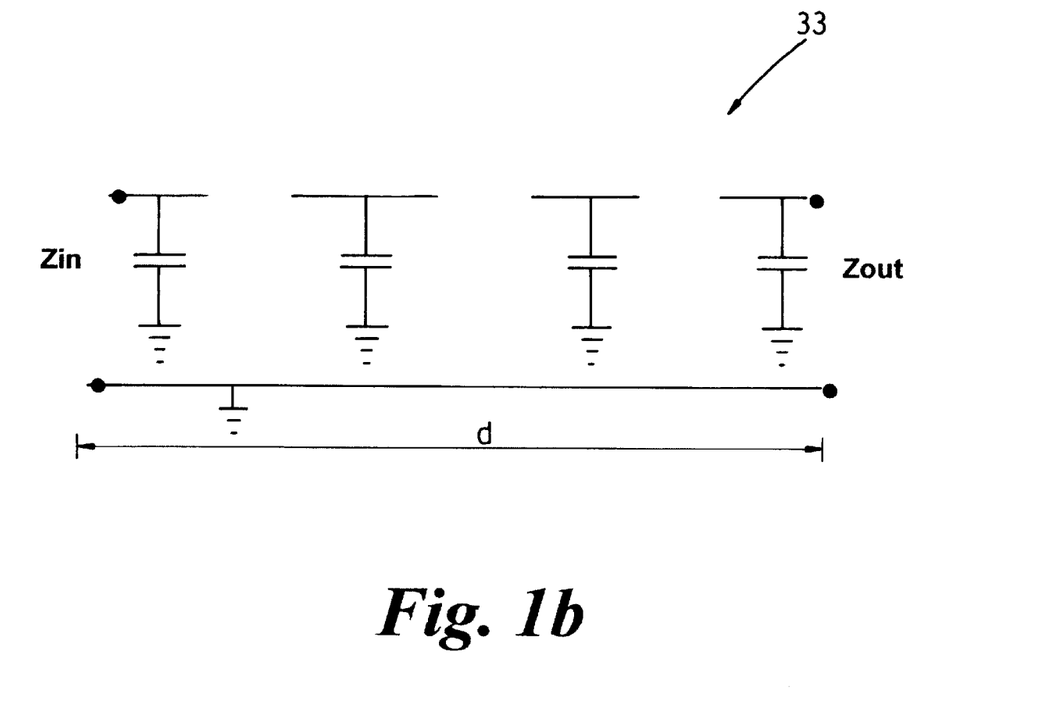
FIG. 1b shows a partial schematic circuit representation for existing ATA cables.

FIG. 1b shows a partial schematic electrical circuit diagram for one signal path of a conventional ATA bus 34 cable. The line 33 of the ATA bus 34 has a source or input impedance $Z_{in}$ and a resulting termination or output impedance $Z_{out}$ which is a function of the input impedance $Z_{in}$, the characteristic impedance $Z_{char}$ of the ATA bus line 33, and the distance d of the ATA bus line 33. As discussed above in the Background section, the ATA bus 34 was not designed to be terminated. Thus, in the ATA bus 34 definition these impedance values for each signal line are such that $Z_{in}<Z_{char}$ and $Z_{char}<Z_{out}$, resulting in the problem of ringing.

For simplicity, the following discussion describes a disk drive connected to a host by an ATA bus. However, as those skilled in the art will recognize, the present invention is capable of being implemented in a system having other peripheral devices on the ATA bus. Additionally, the term host device generally refers to the host end of the ATA bus, which one skilled in the art will recognize to include, for example, the CPU 12 and the ATA bridge/interface 36. The present invention can also be realized in a system having plural drive devices (not shown) connected to the ATA bus 34.

Figure 2:
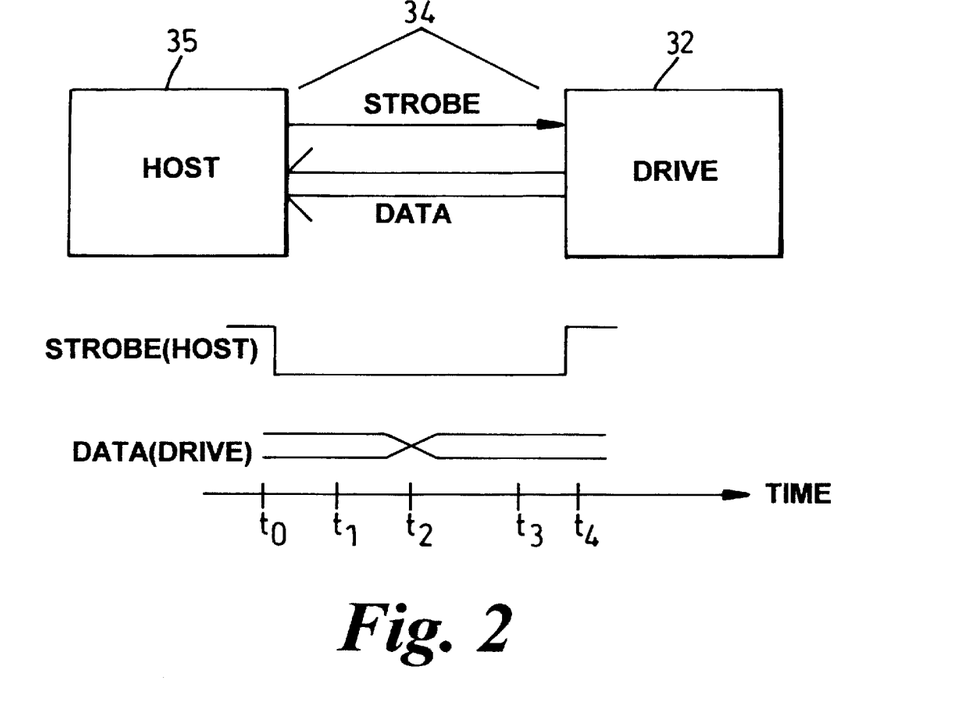
FIG. 2 shows a simplified component and timing diagram for a prior art data transfer protocol.

Referring to FIG. 2, the prior art DMA transfer protocol is a strobed, asynchronous transfer protocol where an ATA host 35 is always in charge of when events are to take place. FIG. 2 shows the strobe signal from the perspective of the host 35, and the data from the perspective of the disk drive 32. When the ATA host 35 wants to read data from an attached disk drive 32, it sends a strobe to the disk drive 32 at time $t_0$. The disk drive 32 does not know when it has to transfer data until it sees the falling edge of the strobe. Prior to receiving the strobe signal, the disk drive 32 is just waiting for the "last minute" notification that it needs to get data ready to send to the host 35. The strobe takes time to travel from the host 35 to the disk drive 32, so the disk drive 32 receives the request later than when the host 35 asks for the data. The disk drive 32 finally sees the strobe at some later time $t_1$. Then after some processing delay, the disk drive 32 puts the data out on the bus at time $t_2$, to be sent back to the host 35. Another transit delay is associated with the data being sent back to the host 35, so the data does not arrive at the host 35 until some later time $t_3$. Another processing delay is associated receiving the data, so the host finally latches the data at time $t_4$. The host must latch the data during the strobe interval, and since there is a certain maximum speed that can be achieved, the strobe interval must be long enough to make sure that the data is available to the host. Thus, in the prior art asynchronous transfer protocol, the strobe interval must take into account transit delays associated with both the host 35 to disk drive 32 transit time and the disk drive 32 to host 35 transit time, as well as processing delays associated with both the host 35 and the disk drive 32. The necessity to account for these delays limits the data transfer rate to those currently obtained with DMA Mode 2 and PIO Mode 4.

Figure 3:
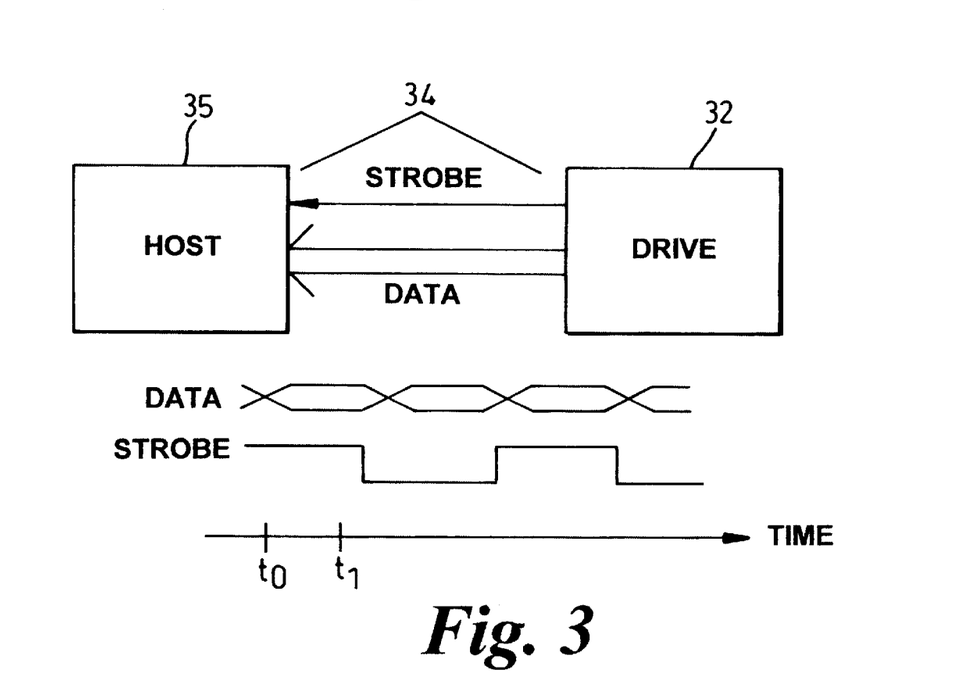
FIG. 3 shows a simplified component and timing diagram for a prior synchronous DMA burst protocol.

The existing synchronous, or Ultra, DMA protocol overcomes the data transfer limits imposed in the prior art transfer protocol by eliminating the situation where the disk drive 32 is waiting for the "last minute" notification that it needs to do a data transfer. (When referring to the existing synchronous DMA protocol, the terms Ultra DMA 33 or Ultra 33 may be used interchangeably herein.) Instead, with Ultra 33, the device which is sending data (whether host 35 or drive 32) is in charge of the controlling strobe signal. FIG. 3 shows a simplified timing diagram, from the perspective of the disk drive 32, of a version of the existing synchronous DMA where the disk drive 32 is in charge of the strobe signal to transfer data for a read DMA burst. Once the host 35 has given a command that it wants to read data and preliminary handshaking to initiate the burst is performed, the disk drive 32 is in charge and determines the time when the data is to be transferred. As shown in FIG. 3, when the disk drive 32 is ready to send the data, it places the data on the bus at time $t_0$, then the disk drive 32 will wait until it knows the data has settled on the cable and the disk drive 32 will toggle the strobe signal at time $t_1$. The toggling of the strobe signal indicates to the host 35 that the data is available, and the data is latched into the host 35 when the strobe generated at time $t_1$ reaches the host.

The delay between the time the disk drive 32 places the data on the bus and the time it toggles the strobe signal is necessary because when data is placed on the ATA bus, there is associated ringing due to the poor termination of the bus, so it is necessary to let the data signal settle before latching it in the host 35. However, the flight or propagation time to get from the disk drive 32 to the host 35 is substantially the same for both the data signal and the strobe signal, and the slew rate (time for a signal to change from "1" to "0" or "0" to "1") is substantially the same for both the data signal and the strobe signal. With the present invention, only the settling time of the data signal needs to be accounted for, since the data and the strobe are sent by one device and the slew rates and propagation delays of these signals are similar. If loading at the host end of the cable changes the slew rate of the data signal, the slew rate of the strobe signal will be changed by a similar amount, and the relative timing of the signals will still be similar. This provides a significant time improvement over the prior art transfer protocol where the host 35 is in charge of the strobe signal and the disk drive 32 is in charge of the data signal. In the prior art situation, time is lost sending the strobe to the disk drive 32, time is lost sending the data to the host 35, and the lost time can never be recovered.

According to aspects of the present invention, very short strobe intervals can be set up since the propagation delays and slew rates in both directions do not have to be accounted for. To ensure data transfer, the synchronous DMA transfer of the present invention only requires a latency for the data to settle before the strobe signal can reach the host 35. Thus, the synchronous DMA burst method of the present invention provides an increased data transfer rate of up to 66.7 MBytes/sec which is double the fastest currently existing synchronous DMA Mode.

Figure 4A:
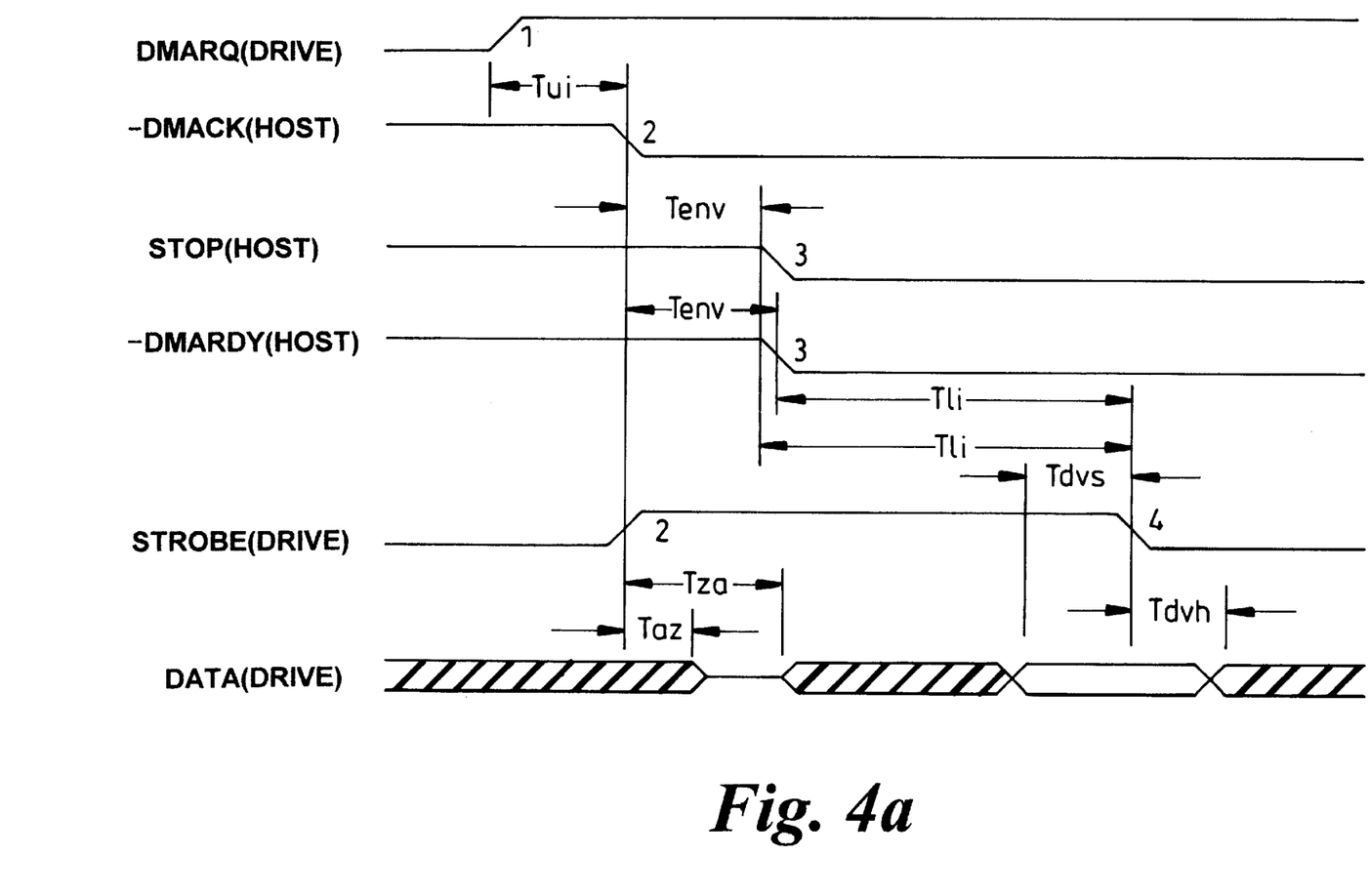
FIG. 4a shows a detailed timing diagram illustrating the data and control signals exchanged during drive initiation of a synchronous DMA burst for a read command.

Details discussing the initiation of a synchronous DMA transfer in general will now be described with reference to FIGS. 4a and 4b. Referring to FIG. 4a, sometime after the host 35 has sent a read command requesting data and the disk drive 32 is ready to begin the data transfer, the disk drive 32 will initiate the synchronous DMA burst by asserting a DMA request signal, DMARQ (indicated as event 1), to the host 35. In response to DMARQ being asserted, when the host 35 is ready to receive the requested data, the host 35 indicates it is ready by asserting a DMA acknowledge signal, -DMACK (indicated as event 2), and must keep -DMACK asserted until the end of the burst. The disk drive 32 can drive or place data on the ATA bus 34 after a minimum time delay $T_{za}$, from assertion of -DMACK, allowing for output drivers to turn on. Typically, the minimum time $T_{za}$ required for the output drivers to turn on is approximately 20 ns. Before the disk drive 32 can toggle the strobe signal which latches the data into the host 35, the disk drive must also wait for the host 35 to deassert a stop signal, STOP, and assert a ready signal, -DMARDY, after the host asserts -DMACK. The deassertion of STOP and assertion of -DMARDY (indicated as events 3) are performed within a standard time envelope for all control signal transitions from the assertion of -DMACK. This time envelope is preferably within a range of approximately 20 to 70 ns.

After the host 35 has deasserted STOP and asserted -DMARDY, the disk drive 32 can send the first strobe signal and must do so within a limited time period $T_{li}$, after seeing the STOP and -DMARDY signals. Preferably, this limited time period $T_{li}$ is within a range of approximately 0 to 150 ns. Additionally, the disk drive 32 must wait a minimum predetermined setup time period $T_{dvs}$, measured from when the disk drive 32 placed the data word on the ATA bus 34, before it can send the first strobe signal. This time period being the time it takes the data to become valid on the ATA bus 34. For existing synchronous DMA transfers, the minimum setup time $T_{dvs}$ is within a range of from about 34 to about 70 ns, depending on the speed selected.

The disk drive 32 sends the first strobe signal to the host 35 by toggling the strobe signal from a high state to a low state (indicated as event 4). The toggling of the strobe signal from the high state to the low state defines a first edge of the strobe signal which is recognized by the host 35 as an indication that valid data is available on the ATA bus 34. When the host 35 sees the edge, it takes the data off of the ATA bus 34. Thus, the toggling of the strobe signal is used to latch the data in the host 35 during a read burst.

Figure 4B:
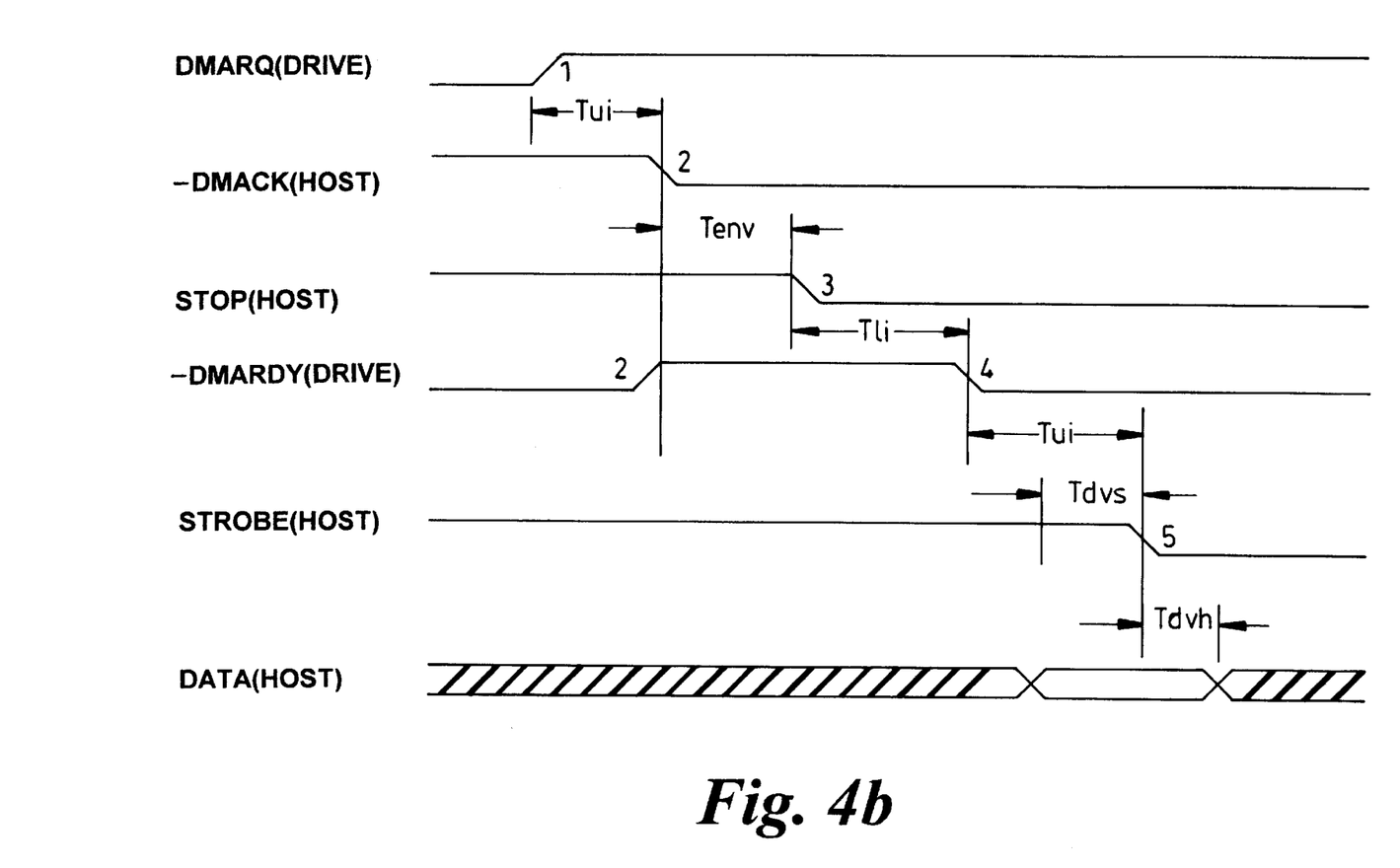
FIG. 4b shows a detailed timing diagram illustrating the data and control signals exchanged during drive initiation of a synchronous DMA burst for a write command.

Referring now to FIG. 4b, the initiation of the synchronous DMA burst for a write command will be described according to principles of the present invention. As in the case with a read command, the synchronous DMA burst is initiated by the disk drive 32 asserting DMARQ when it is ready to begin the synchronous DMA burst (event 1). In response to DMARQ being asserted, when the host 35 is ready to write its data, the host 35 indicates it is ready by asserting -DMACK (indicated as event 2) and deasserts STOP (indicated as event 3) within the standard time envelope of -DMACK. Additionally, the host 35 drives data on the ATA bus 34. The host 35 then waits for the disk drive 32 to assert -DMARDY which indicates that the disk drive 32 is ready to receive data from the host 35. The disk drive 32 must assert -DMARDY (indicated as event 4) within the limited time period $T_{li}$ after seeing -DMACK asserted and STOP deasserted. Since the host 35 is now sending data, the host 35 is now also in charge of the strobe signal, but before the host 35 can toggle the strobe signal, it must wait for -DMARDY to be asserted by the disk drive 32 as described above.

Once the disk drive 32 asserts -DMARDY, the host 35 may toggle the first strobe signal (indicated as event 5) anytime after seeing -DMARDY. However, the host 35 must wait the minimum predetermined setup time period $T_{dvs}$, measured from when the host 35 placed the data word on the ATA bus 34, before it can send the first strobe signal, to allow for the data to become valid. Similar to the read case, when the disk drive 32 sees the first edge of the strobe signal, it knows to take valid data off of the ATA bus 34. Thus, the toggling of the strobe signal is used to latch the data in the disk drive 32 during the write burst.

Figure 5:
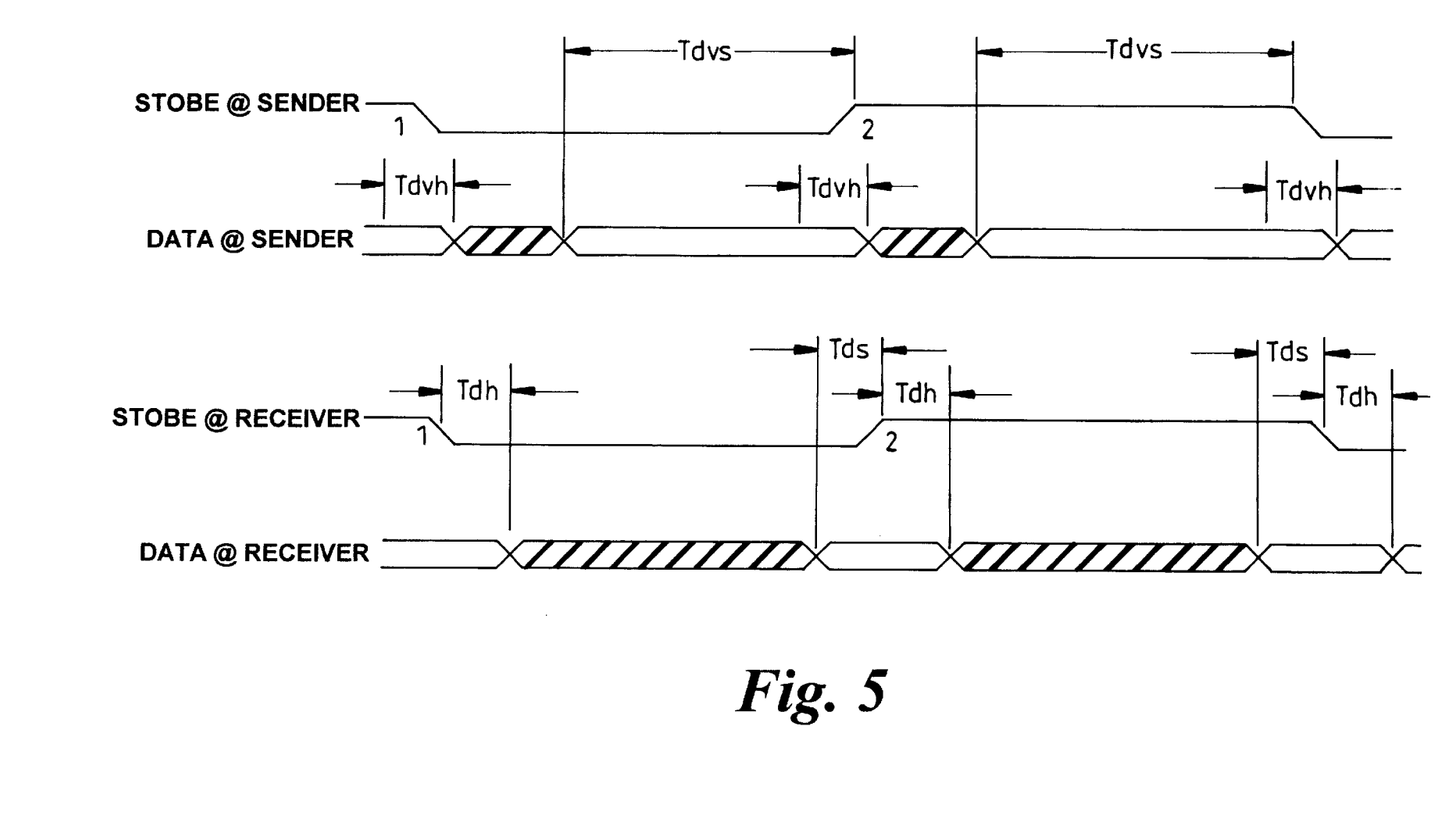
FIG. 5 shows a detailed timing diagram illustrating the data and control signals exchanged during a sustained synchronous DMA burst according to further aspects of the present invention.

After the synchronous DMA burst is initiated and the first data word is latched into the host 35, in the case of a read command, or into the disk drive 32, in the case of a write command, additional data words can be transferred during the synchronous DMA burst. FIG. 5 shows a timing diagram of the control and data signals during a sustained synchronous DMA burst transferring plural data words. The figure generically depicts the data bus as seen by a sender and a receiver, rather than the host and disk drive, to be applicable to both the case of a read burst and a write burst. As described above, a first data word which was driven on the ATA bus 34 at some earlier time $t_1$ (not shown) is latched into the receiver by the toggling of the strobe from the high state to the low state (event 1). At a second later time $t_2$, a next data word is driven on the ATA bus 34. This next data word is latched into the receiver by toggling the strobe signal from the low state to the high state (event 2). The toggling of the strobe signal from the low state back to the high state defines a second edge of the strobe signal. Further additional words can be driven on the ATA bus 34 by the sender and latched into the receiver by toggling of the strobe signal back and forth between the high and low states. From the receiver's viewpoint, whenever an edge of the strobe signal is seen, the receiver knows to take data off of the ATA bus 34. Thus, both edges of the strobe signal are utilized in the synchronous DMA burst to transfer data.

As shown in FIG. 5 and described above, during the synchronous DMA burst, the sender always drives data onto the ATA bus 34 and after the minimum predetermined setup time period $T_{dvs}$ allowing for cable settling and setup time, the sender will toggle the strobe signal. Using both edges of the strobe signal in the manner described above enables the frequency of the strobe signal to match the frequency of the data.

Furthermore, the data is shown differently at the sender and the receiver to emphasize that cable settling time will not allow the data to be considered stable at the receiver until long after it is driven at the sender. The minimum predetermined setup time that data is required valid at the sender $T_{dvs}$, and the minimum time that the data may go invalid after the sender toggles the strobe signal $T_{dvh}$, form a wider window than the data setup time $T_{ds}$ and the data hold time $T_{dh}$ guaranteed to the receiver.

The improved synchronous DMA method of the present invention uses the general synchronous DMA transfer protocol described above and optimizes the times illustrated and described for FIG. 5. The following table illustrates the preferred timing requirements necessary to perform the increased data transfer rate synchronous DMA according to principles of the present invention. The essential concept to the present invention being that the data hold time for the receiving device must be set at 0 ns while the data valid hold time for the sending device must be controlled to be about 3 ns.

As discussed in the Notes of Table 1, most of the timing requirements listed are measured at the connector of the respective devices. One significant exception is the data hold time for the receiving device of the present method. This measurement is taken at the ASIC I/O pin. If this timing were to be measured at the connector, the required timing in order to have a 0 ns data hold time at the ASIC pin would be calculated as:

Max rising transition delay−Min falling transition delay+ Max PCB trace skew+min req. hold time at ASIC.

Using the measurements listed in Table 2, a 2.75 ns hold time (1.5−(−1)+0.25+0) would be required if the data hold time for the receiving device were measured at the connector.

TABLE 1

Synchronous DMA Timing Requirements

| NAME | MODE 0 (in ns) MIN | MODE 0 (in ns) MAX | MODE 1 (in ns) MIN | MODE 1 (in ns) MAX | MODE 2 (in ns) MIN | MODE 2 (in ns) MAX | MODE 3 (in ns) MIN | MODE 3 (in ns) MAX | MODE 4 (in ns) MIN | MODE 4 (in ns) MAX | COMMENT (see Notes 1 and 2) |
|---|---|---|---|---|---|---|---|---|---|---|---|
| $t_{CYC}$ | 114 | | 75 | | 55 | | 38 | | 23 | | Cycle time (from STROBE edge to STROBE edge) |
| $t2_{CYC}$ | 235 | | 156 | | 117 | | 88 | | 58 | | Two cycle time (from rising edge to next rising edge or from falling edge to next falling edge of STROBE) |
| $t_{DS}$ | 15 | | 10 | | 7 | | 7 | | 7 | | Data setup time (at recipient) |
| $t_{DH}$ | 5 | | 5 | | 5 | | 0 | | 0 | | Data hold time (at recipient) (see Note 4) |
| $t_{DVS}$ | 70 | | 48 | | 34 | | 23 | | 10 | | Data valid setup time at sender (from data valid until STROBE edge) (see Note 5) |
| $t_{DVH}$ | 6 | | 6 | | 6 | | 3 | | 3 | | Data valid hold time at sender (from STROBE edge until data may become invalid) (see Note 5) |
| $t_{FS}$ | 0 | 230 | 0 | 200 | 0 | 170 | 0 | 125 | 0 | 110 | First STROBE time (for device to first negate DSTROBE from STOP during a data in burst) |
| $t_{LI}$ | 0 | 150 | 0 | 150 | 0 | 150 | 0 | 80 | 0 | 80 | Limited interlock time (see Note 3) |
| $t_{MLI}$ | 20 | | 20 | | 20 | | 20 | | 20 | | Interlock time with minimum (see Note 3) |
| $t_{UI}$ | 0 | | 0 | | 0 | | 0 | | 0 | | Unlimited interlock time (see Note 3) |
| $t_{AZ}$ | | 10 | | 10 | | 10 | | 10 | | 10 | Maximum time allowed for output drivers to release (from asserted or negated) |
| $t_{ZAH}$ | 20 | | 20 | | 20 | | 20 | | 20 | | Minimum delay time required for output drivers to assert or negate (from released) |
| $t_{ZAD}$ | 0 | | 0 | | 0 | | 0 | | 0 | | |
| $t_{ENV}$ | 20 | 70 | 20 | 70 | 20 | 70 | 20 | 55 | 20 | 55 | Envelope time (from DMACK- to STOP and HDMARDY- during data in burst initiation and from DMACK to STOP during data out burst initiation) |
| $t_{SR}$ | | 50 | | 30 | | 20 | | NA | | NA | STROBE-to-DMARDY- time (if DMARDY- is negated before this long after STROBE edge, the recipient shall receive no more than one additional data word) |
| $t_{RFS}$ | | 75 | | 60 | | 50 | | 50 | | 50 | Ready-to-final-STROBE time (no STROBE edges shall be sent this long after negation of DMARDY-) |
| $t_{RP}$ | 160 | | 125 | | 100 | | 90 | | 90 | | Ready-to-pause time (that recipient shall wait to initiate pause after negating DMARDY-) |
| $t_{IORDYZ}$ | | 20 | | 20 | | 20 | | 20 | | 20 | Maximum time before releaseing IORDY |
| $t_{ZIORDY}$ | 0 | | 0 | | 0 | | 0 | | 0 | | Minimum time before driving IORDY |
| $t_{ACK}$ | 20 | | 20 | | 20 | | 20 | | 20 | | Setup and hold times for DMACK- (before assertion or negation) |
| $t_{SS}$ | 50 | | 50 | | 50 | | 50 | | 50 | | Time from STROBE edge to negation of DMARQ or assertion of STOP (when sender terminates a burst) |

Notes:
1) Timing parameters shall be measured at the connector of the device to which the parameter applies (see Note 4 for exceptions). For example, the sender shall stop generating STROBE edges $t_{RFS}$ after the negation of DMARDY-. Both STROBE and DMARDY- timing measurements are taken at the connector of the sender.
2) All timing measurement switching points (low to high and high to low) shall be taken at 1.5 V.
3) $t_{UI}$, $t_{MLI}$ and $t_{LI}$ indicate sender-to-recipient or recipient-to-sender interlocks, that is, one agent (either sender or recipient) is waiting for the other agent to respond with a signal before proceeding. $t_{UI}$ is an unlimited interlock that has no maximum time value. $t_{MLI}$ is a limited time-out that has a defined minimum. $t_{LI}$ is a limited time-out that has a defined maximum.
4) $t_{DH}$ timing for modes 3 and 4 shall be measured at the I/O pin of the controller component and not the connector.
5) Special cabling shall be required in order to meet both data setup ($t_{DVS}$) and data hold ($t_{DVS}$) times in mode 4.

Additionally, to achieve the maximum transfer rates of 44.4 Mbytes/sec and 66.7 Mbytes/sec obtainable when carrying out the method of the present invention, a 66.6 MHz clock (15 ns period) is required. Table 2 below sets forth other system timings, delays and skews.

TABLE 2

System Timing, Delays and Skews

Minimum typical cycle times (maximum typical transfer rate):

Mode 3 = 45 ns
Mode 4 = 30 ns
Rising edge:

5 ns minimum, 12 ns maximum
With linear slew to 5 V and 5 ns rise time: low to 1.5 V threshold = 1.5 ns minimum
With linear slew to 5 V and 12 ns rise time: low to 1.5 V threshold = 3.6 ns maximum
Typical low to threshold time = 2.5 ns
Falling edge:

5 ns minimum, 12 ns maximum
With linear slew from 5 V and 5 ns fall time: high to 1.5 V threshold = 3.5 ns minimum
With linear slew from 5 V and 10 ns fall time: high to 1.5 V threshold = 8.4 ns maximum
Typical high to threshold time = 6.0 ns
System Clock Variation = +/− 2% maximum
Asymmetry = 60/40% maximum
PCB Traces:

Delay = 0.5 ns maximum
Skew between signals due to traces = 0.25 ns maximum
Termination Resistors:

Falling transition delay through 82 ohms = −0.5 ns minimum, +0.5 ns maximum
Rising transition delay through 82 ohms = +0.5 ns minimum, +1.5 ns maximum
Falling transition delay through 33 ohms = −1.0 ns minimum, 0 ns maximum
Rising transition delay through 33 ohms = 0 ns minimum, +1.0 ns maximum
ASIC input buffers Delay = 4.0 ns maximum
Skew between different input buffers of any two signals = 2.5 ns maximum
Skew from STROBE to all data input buffers = 1.0 ns minimum, 3.0 ns maximum (data delayed)
Flip-flop setup time (internal) = 2.0 ns minimum
Flip-flop hold time (internal) = 1.0 ns minimum
Flip-flop clock to Q delay (internal) = 3.0 ns maximum
ASIC output buffers Delay = 7 ns maximum
Skew between different output buffers = 2 ns maximum
STROBE to data output buffer skews can be controlled to 1 ns minimum, 3 ns maximum or −3 ns
   min, −1 ns max (one or the other, data always delayed longer or data always delayed less)
Jitter on output = +/− 0.25 ns maximum
Cable Control signal to data signal skew = 0 ns minimum, 2 ns maximum (Data delay control signal delay)
Delay through cable = 10 ns maximum

---

The versions of the present invention have been described with reference to performing a single synchronous DMA burst for transferring one or more data words. However, since a host read or write command can require the performance of a series of synchronous DMA bursts, those skilled in the art will recognize that the above described versions of performing the synchronous DMA burst are repeated until the host read or write command is completed. The disk drive 32 must initiate the second/additional synchronous DMA burst, the host 35 must indicate that it is ready to start the burst, and so on, as described above.

The versions of the present invention described above are easily implemented in existing systems with an ATA interface by modifying existing ATA connector cables. The method having features of the present invention requires a cable having additional grounds between the data lines. An example of such a cable is described in co-pending, co-assigned U.S. patent application Ser. No. 08/822,885 now U.S. Pat. No. 5,928,028, and incorporated herein by reference.

The improved synchronous DMA burst transfer method of the present invention provides several advantages over the prior art transfer methods. The present method provides an inexpensive way to get around the inadequate cabling structure and unreasonable termination inherent to the ATA bus 34 to obtain an increased data transfer rate of approximately 66.7 MBytes/sec. The present method can be implemented using existing synchronous DMA transfer protocols by modifing and optimizing certain timing requirements. Additionally, the method of the present invention requires little hardware changes to the existing systems.

Having thus described the invention in considerable detail with reference to certain preferred embodiments thereof, it will be appreciated that other embodiments are possible. It will be understood by those skilled in the art that many changes in construction and circuitry and applications of the invention will suggest themselves without departing from the spirit and scope of the invention. Therefore, the spirit and scope of the appended claims should not be limited to the description of the preferred embodiments contained therein.

What is claimed is:

1. A method for increasing a rate of data transfer over a bus for synchronous DMA burst transfers between a sending device and a receiving device, the method comprising the steps of:

(a) minimizing a data hold time of the receiving device; and (b) controlling a data valid hold time of the sending device; the data valid hold time including a minimum latency corresponding to a time required for data to settle on the bus after placement thereon by the sending device, and wherein a maximum setup time margin is provided for obtaining an increased rate of data transfer.

2. A method for increasing a rate of data transfer over a bus for synchronous DMA burst transfers between a sending device and a receiving device, the method comprising the steps of:

minimizing a data hold time of the receiving device to approximately 0 nanoseconds; and controlling a data valid hold time of the sending device to approximately 3 nanoseconds, and wherein a maximum setup time margin is provided for obtaining an increased rate of data transfer, and the bus has a maximum data transfer rate of between about 44.4 Mbytes/sec and about 66.7 Mbytes/second.

3. The method of claim 1 further comprising the step of:

(c) controlling a data valid setup time of the sending device; and wherein the minimum latency is controlled by the sending device.

4. The method of claim 3, wherein the data valid setup time of the sending device is approximately about 23 ns to obtain the maximum data transfer rate of approximately about 44.4 Mbytes/sec.

5. The method of claim 3, wherein the data valid setup time of the sending device is approximately about 10 ns to obtain the maximum data transfer rate of approximately about 66.7 Mbytes/sec.

6. A method of performing synchronous DMA burst transfers comprising:

a sending device sending data over a bus to a receiving device;

minimizing a data hold time of the receiving device including controlling internal delays and skew within circuitry disposed between inputs and a flip-flop of the receiving device; and controlling a data valid hold time of the sending device, wherein a maximum setup time margin is provided for obtaining an increased rate of data transfer.

7. The method of performing synchronous DMA burst transfers of claim 6, wherein controlling the delays includes delaying the data from one or more of the inputs longer than the strobe clock signal so that a non-zero hold time is provided at the receiving device flip-flop.

* * * * *